(12) United States Patent
Talbert (10) Patent No.: US 8,745,283 B1
(45) Date of Patent: Jun. 3, 2014

(54) CABLING VERIFICATION IN A NETWORK TESTING SYSTEM

(75) Inventor: Timothy C. Talbert, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 12/841,513

(22) Filed: Jul. 22, 2010

(51) Int. Cl.
*G06F 3/00* (2006.01)

(52) U.S. Cl.
USPC .................................. 710/16; 710/8; 710/15

(58) Field of Classification Search
None
See application file for complete search history.

(56) References Cited

U.S. PATENT DOCUMENTS

| | | | | |
|---|---|---|---|---|
| 7,555,572 | B2 * | 6/2009 | Fischer | 710/11 |
| 8,115,631 | B2 * | 2/2012 | Lange et al. | 340/572.1 |
| 2005/0182535 | A1 * | 8/2005 | Huang | 701/29 |
| 2006/0277324 | A1 * | 12/2006 | Aldereguia et al. | 710/1 |
| 2011/0187385 | A1 * | 8/2011 | Betz et al. | 324/543 |

* cited by examiner

*Primary Examiner* — Idriss N Alrobaye
*Assistant Examiner* — Dayton Lewis-Taylor
(74) *Attorney, Agent, or Firm* — Donna P. Suchy; Daniel M. Barbieri (57) ABSTRACT

A cabling verification system may include, but is not limited to: a first cable comprising: a first end terminating in a first type of connector, a second end terminating in a second type of connector, and a first memory element containing data associated with the identity of the first connector type; and a cabling interface comprising: an input configured to couple with the second type of connector; a database comprising one or more verified cable connection schemes; and a processor configured to: obtain data associated with the identity of the first connector type; and compare the data associated with the identity of the first connector type to the one or more connection schemes.

11 Claims, 8 Drawing Sheets

CABLING VERIFICATION IN A NETWORK TESTING SYSTEM

BACKGROUND

Platforms for testing components of modern networks (e.g. avionics networks) may benefit from the flexibility of utilizing common cabling connectors to link multiple test data sources with multiple devices under test. However, utilization of common cabling connectors with the diverse interconnects associated with such devices may lead to errors in cabling between the sources and the interface or the interface and the devices under test. As such, it may be desirable to provide a system for verifying the propriety of such cabling.

SUMMARY

A cabling verification system may include, but is not limited to: a first cable comprising: a first end terminating in a first type of connector, a second end terminating in a second type of connector, and a first memory element containing data associated with the identity of the first connector type; and a cabling interface comprising: an input configured to couple with the second type of connector; a database comprising one or more verified cable connection schemes; and a processor configured to: obtain data associated with the identity of the first connector type; and compare the data associated with the identity of the first connector type to the one or more connection schemes.

A method for cabling verification may include, but is not limited to: receiving a first end of a first cable having a first type of cable connector; detecting a type of cable connector associated with a second end of the first cable; and comparing the detected type of cable connector associated with the second end of the cable to a connection schematic including a required type of cable connector.

BRIEF DESCRIPTION OF THE DRAWINGS

The disclosure will become more fully understood from the following detailed description, taken in conjunction with the accompanying drawings, wherein like reference numerals refer to like elements, in which Figure Reference No.

DETAILED DESCRIPTION

Before describing in detail the particular improved system and method, it should be observed that the invention may include, but may be not limited to a novel structural combination of conventional data/signal processing components and circuits, and not in the particular detailed configurations thereof. Accordingly, the structure, methods, functions, control and arrangement of conventional components, software and circuits have, for the most part, been illustrated in the drawings by readily understandable block representations and schematic diagrams, in order not to obscure the disclosure with structural details that will be readily apparent to those skilled in the art, having the benefit of the description herein. Further, the invention may be not limited to the particular embodiments depicted in the exemplary diagrams, but should be construed in accordance with the language in the claims.

It may be desirable to utilize common cabling connectors for various interconnect types to provide a level of standardization around which multiple peripheral devices may be designed.

Figure 1:
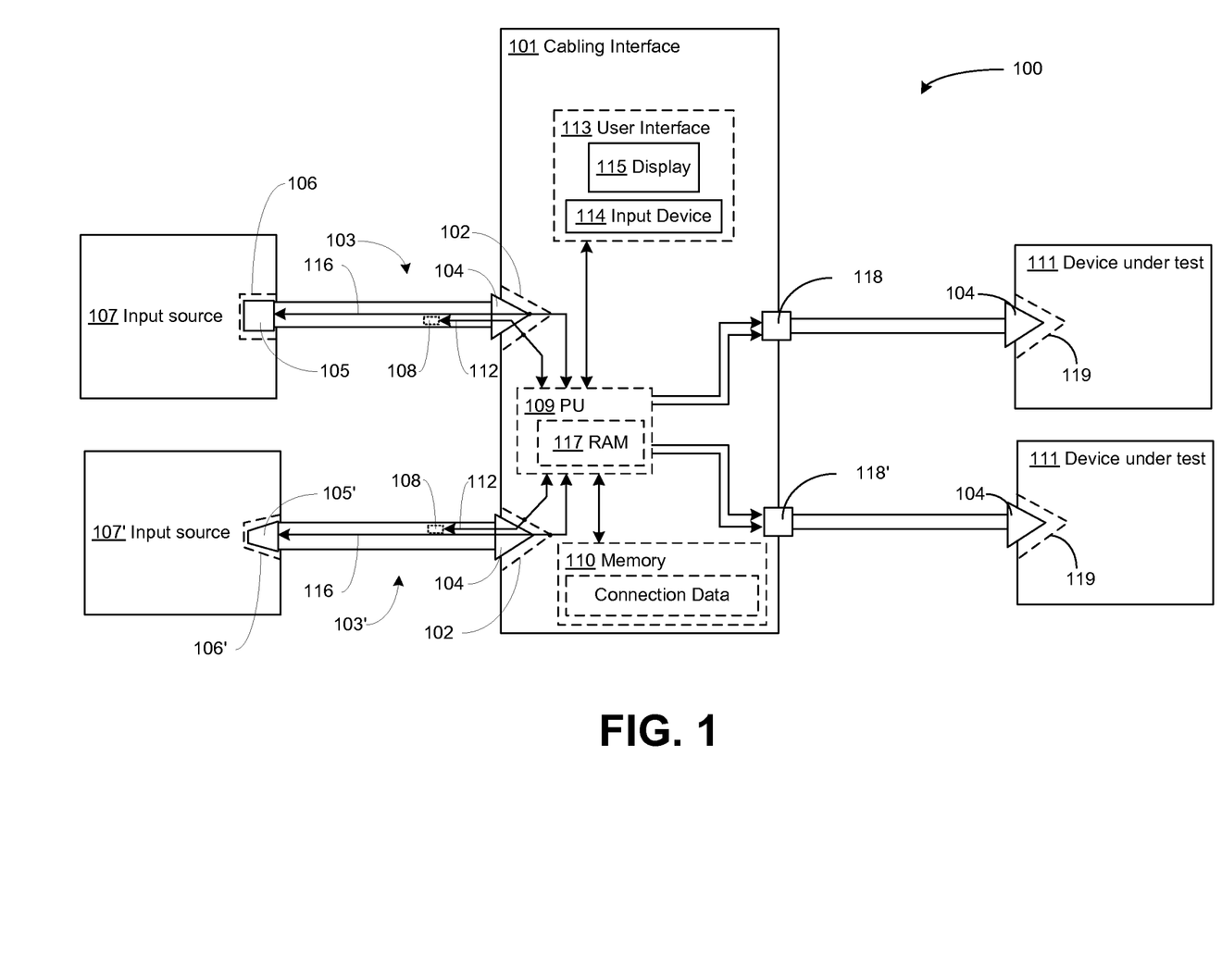
FIG. 1 illustrates a cabling verification system.

Referring to FIG. 1, a cabling verification system 100 is shown. The system 100 may be employed to ensure proper cabling within any system where multiple input devices and multiple output devices are connected by one or more cables connecting that employ identically keyed connectors while transmitting diverse signals (e.g. power, communications data, control signals, etc.) For example, the system 100 may be employed in a testing environment where multiple test devices may be routed to multiple devices-under-test where each device under test has a common input port keying. In another example, the system 100 may be employed to protect a card cage system with multiple cards or an expandable system incorporating pluggable modules (e.g. CompactPCI) where each card or module has an identical mating connector.

The system 100 may include a cabling interface 101. The cabling interface 101 may include at least one input port 102 keyed to a first type of connector. For example, the input port 102 may be keyed to interface with an ARINC 429-type connector, an Ethernet cable (e.g. CAT5 or CAT6) connector, a coaxial cable connector, a fiber optic cable connector, a military circular connector, a circuit card or module connector (e.g. CompactPCI), an ARINC 600 (or similar) interface connector or any other type of cable connector.

The system 100 may include at least one cable 103. Each cable 103 may include a first connector 104 configured to interface with the input port 102. Each cable 103 may further include a second connector 105. The second connector 105 may be the same as or distinct from the connector 104. The second connector 105 may be keyed to an output 106 of an input source 107. For example, the output 106 may be keyed to interface with an ARINC 429-type connector, an Ethernet cable (e.g. CAT5 or CAT6) connector, a coaxial cable connector, a fiber optic cable connector, a military circular connector, a circuit card or module connector (e.g. CompactPCI), an ARINC 600 (or similar) interface connector or any other type of cable connector. The input source 107 may be an electrical test signal generator, a power source, a measurement instrument, communications source or receiver (e.g., Ethernet, RS-232), RF generating or receiving equipment, optical test or communications equipment, network test equipment, switching system, a cable extender, and the like.

The system 100 may include a second cable 103'. The second cable 103' may include connector 104 that is the same as connector 104 of cable 103 and configured to interface with the input port 102. The second cable 103' may further include a second connector 105'. The second connector 105' may be distinct from the connector 105 of the first cable 103. The second connector 105' may be keyed to an output 106' of a second input source 107' different than the first input source 107. For example, the output 106' may be keyed to interface with an ARINC 429-type connector, an Ethernet cable (e.g. CAT5 or CAT6) connector, a coaxial cable connector, a fiber optic cable connector, a military circular connector, a circuit card or module connector (e.g. CompactPCI), an ARINC 600 (or similar) interface connector or any other type of cable connector. The input source 107' may be an electrical test signal generator, a power source, a measurement instrument, communications source or receiver (e.g., Ethernet, RS-232), RF generating or receiving equipment, optical test or communications equipment, network test equipment, switching system, a cable extender, and the like.

It will be recognized that the respective keying of all connector pairs may include male-female or female-male, respectively, without departing from the scope of the invention.

Figure 2A:
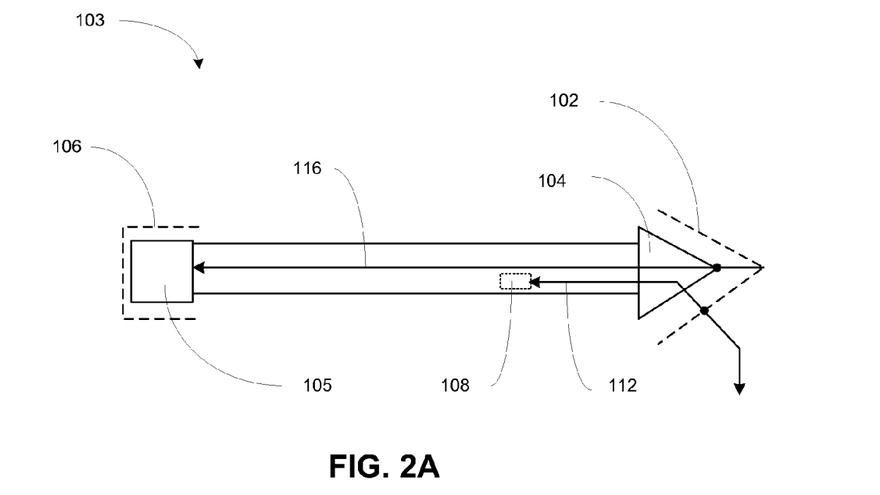
FIG. 2A illustrates a first cable having a first type of connector and as second type of connector.
Figure 2B:
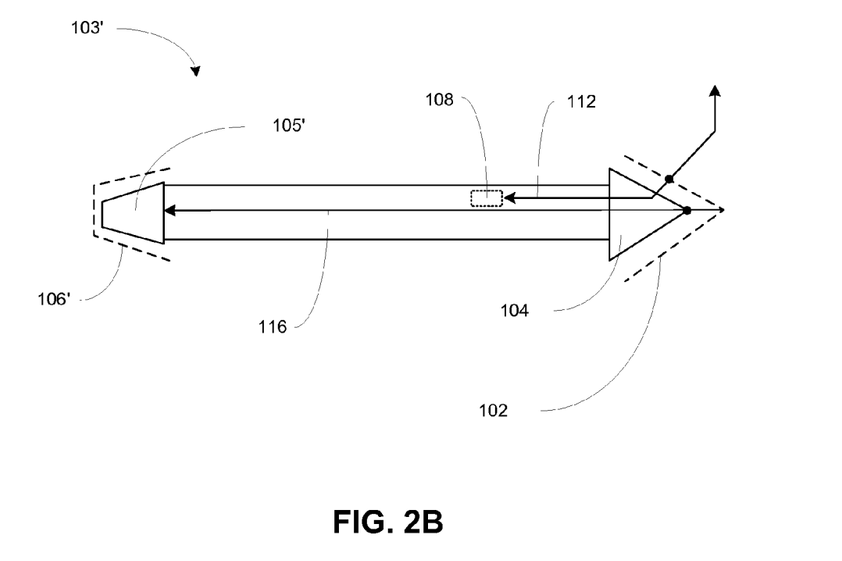
FIG. 2B illustrates a second cable having the first type of connector and a third type of connector.

Referring to FIGS. 2A and 2B, each of the cable 103 and the cable 103' may include a memory element 108. The memory element 108 may be read-only memory (e.g. mask-programmed ROM, programmable ROM and the like.) The memory element 108 of each of cable 103 and cable 103' may contain data regarding the identity of the cable. For example, the memory element 108 may contain data regarding a cable type (e.g. a power supply cable, Ethernet cable, ARINC 429-type cable, and the like. Additionally, the memory element 108 may contain data regarding cable connector identification. For example, a three-connector cable may contain data regarding the identities of each of the connectors (e.g. connector identification designators "P1," "P2," and "P3" for a power cable; connector identification designators "E1," "E2," and "E3" for an Ethernet cable).

While shown as an embedded memory element 108, the data regarding the identity of the cable may be maintained in any manner capable of encoding and storing that identity data. For example, the memory may consist of any mechanism suitable for uniquely identifying the cable type. This may include a resistor or a pattern of pin connections in place of memory element 108.

Referring again to FIG. 1, the cabling interface 101 may further include a processing unit 109 and a memory element 110. The processing unit 109 may provide virtual keying functionality where the processing unit 109 may detect the type of cable 103 connected to the cabling interface 101 and determine if it is the proper cable for use in a particular testing scenario. The memory element 110 may store cabling schemes for various testing scenarios. For example, a particular device under test 111 (e.g. a flight control or other avionics unit) may require a corresponding type of input signal transported via a particular cable 103 (e.g. an ARINC 429 cable). Each input port 119 of each device under test 111 may be configured to receive a common connector type. The common connector may be the same as connector 104 of cable 103 received by input port 102 of the cabling interface 101. The association of a particular type of cable 103 required for use in connecting a particular input source 107 to a particular device under test 111 may be characterized as a connection scheme. Data regarding such connection schemes may be maintained in the memory element 110 for access by the processing unit 109.

The processing unit 109 may be operably coupled to the memory element 108 via a link 112 established when a cable 103 or cable 103' is connected to the cabling interface 101 via a connector 104 and an input port 102. The processing unit 109 may read the cable identification data from the memory element 108 and utilize that data in various computational operations.

The cabling interface 101 may further include a user interface 113 which may receive user inputs regarding cabling interface 101 operations as well as provide user feedback regarding those requests. For example, the user interface 113 may include a user input device 114 (e.g. a keyboard, mouse, touch screen, and the like) and display device 115 (e.g. a monitor, touch screen, indicator LED, and the like). While depicted as integrated within the cabling interface 101, the user interface 113 may be implemented in any number of internal or external devices such as dedicated computing devices (e.g. an application specific computing device), general-purpose computing device (e.g. a laptop computer, a desktop computer, etc.) running application specific software, mobile devices (e.g. laptop computers, smart phones, PDAs, etc.), and the like. The coupling between the cabling interface 101 and the user interface 113 may be wired or wireless.

The system 100 may also be able identify additional cables and/or modules connected to the ends of a cable 103. For example, Referring to FIG. 3, in connecting to an input port 102 to the cabling interface 101, cable 103 and cable 103' may be daisy-chained to provide a cabling extension. The cabling interface 101 may query the memory element 108 and memory element 108' of cable 103 and cable 103' via link 112 and link 112' to obtain cable identification data regarding of cable 103 and/or cable 103'. Additionally, the input port 102 itself may also include a memory element 108 containing cabling identification information regarding cables that may be properly connected to its output port 118 that may be queried by the cabling interface 101 via link 112".

Following is a description of a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 4:
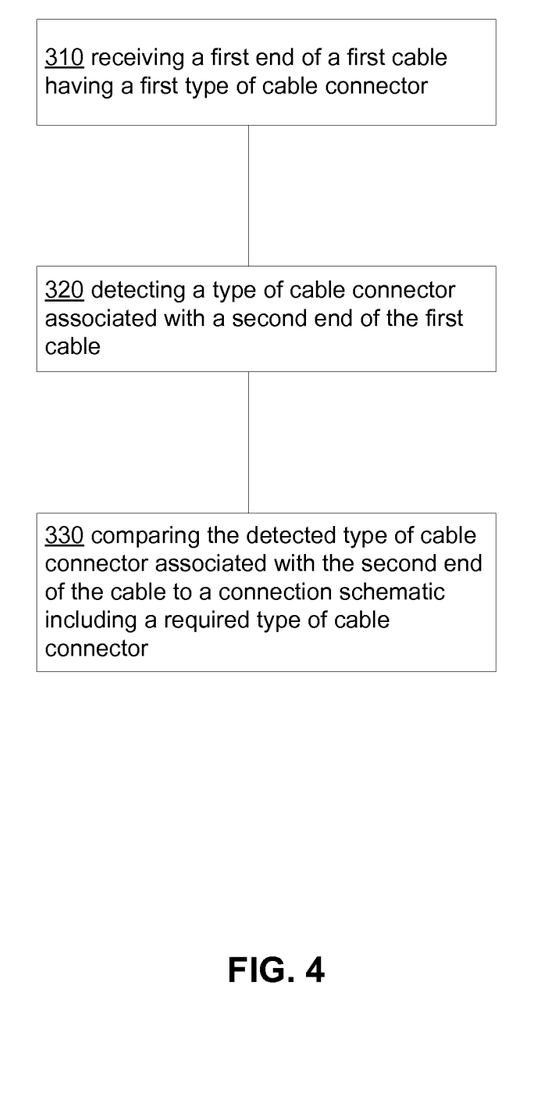
FIG. 4 is a high-level logic flowchart of a process.

FIG. 4 illustrates an operational flow 400 representing example operations related to providing server fault notifications. In FIG. 4 and in following figures that include various examples of operational flows, discussion and explanation may be provided with respect to the above-described examples of FIG. 4, and/or with respect to other examples and contexts. However, it should be understood that the operational flows may be executed in a number of other environments and contexts, and/or in modified versions of FIG. 4. In addition, although the various operational flows are presented in the sequence(s) illustrated, it should be understood that the various operations may be performed in other orders than those that are illustrated, or may be performed concurrently.

Figure 3:
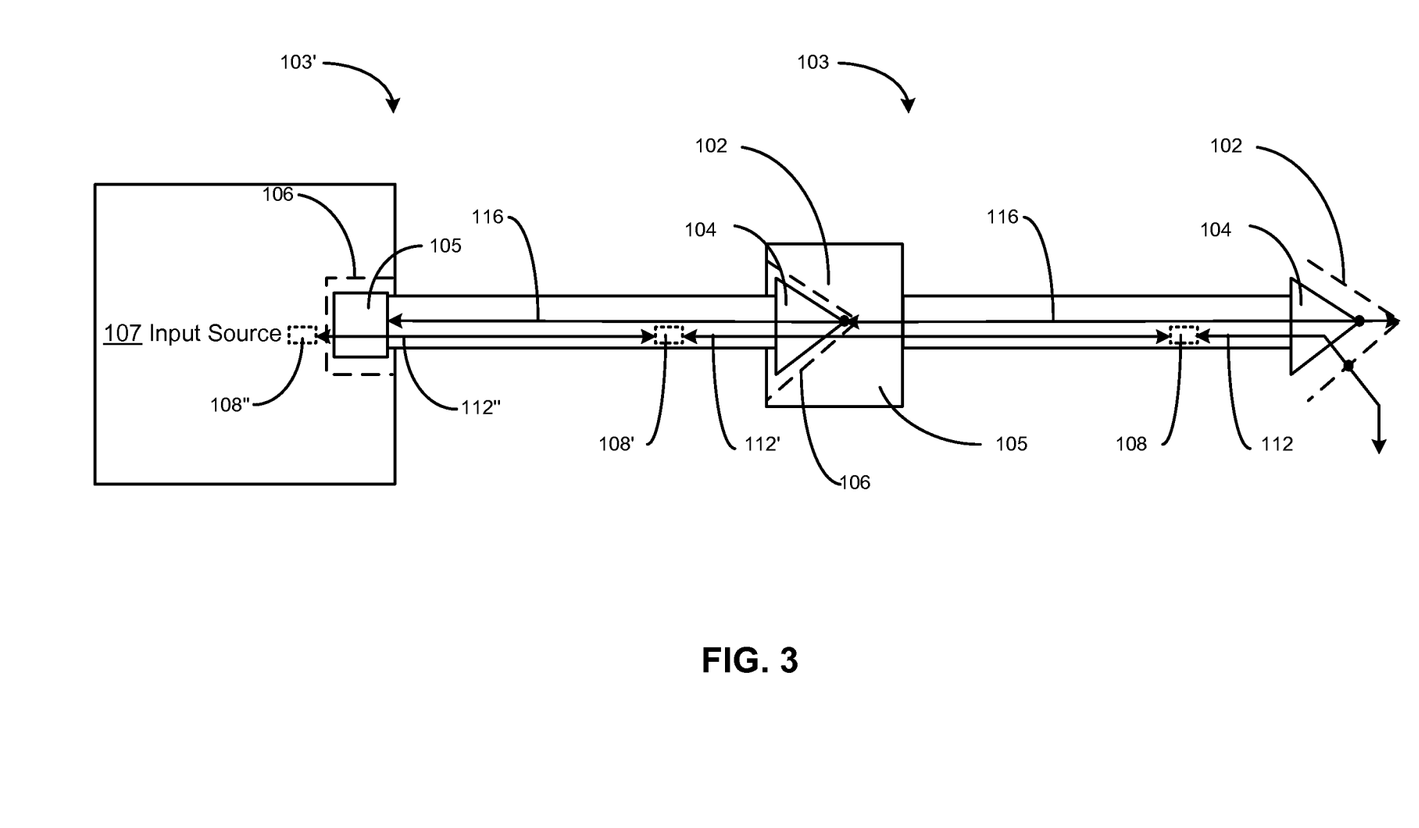
FIG. 3 illustrates a first cable and a second cable configured in series.

Operation 410 depicts receiving a first end of a first cable having a first type of cable connector at an input port. For example, as shown in FIGS. 1-3, the connector 104 on the first end of the cable 103 may be connected to the cabling interface 101 via input port 102. Connection of the connector 104 with the input port 102 may serve to establish the physical link 112 between the memory element 108 of the cable 103 and the processing unit 109. The connection of the connector 104 with the input port 102 may serve to establish the physical link 116 between the cabling interface 101 and the input source 107. The circuitry of the cabling interface 101 may route signals from the link 112 and the link 116 may to the processing unit 109.

Operation 420 depicts detecting a type of cable connector associated with a second end of the first cable. For example, as shown in FIGS. 1-3, the processing unit 109 may query the memory element 108 of the cable 103 via the link 112 to obtain data regarding the identity of the second connector 105 on the second end of the cable 103. The data regarding the identity of the second connector 105 may be maintained in random access memory (RAM 117) associated with the processing unit 109.

Operation 430 depicts comparing the detected type of cable connector associated with the second end of the cable to a connection schematic including a required type of cable connector. For example, as shown in FIGS. 1-3, the processing unit may compare the detected type of connector 105 to a connection schematic data maintained in memory element 110. The connection schematic may include a designation of a required connector 105 necessary for linking a particular input source 107 to a particular device under test 111 (e.g. an Ethernet cable may be required for providing test signals to test the functionality of a data processing unit under test 111; a power cable may be required for testing the functionality of a power regulation system under test 111; etc.) The comparison of the connector 105 of the currently attached cable 103 to the connection schematic may allow the processing unit 109 to determine whether that usage is proper.

Figure 5:
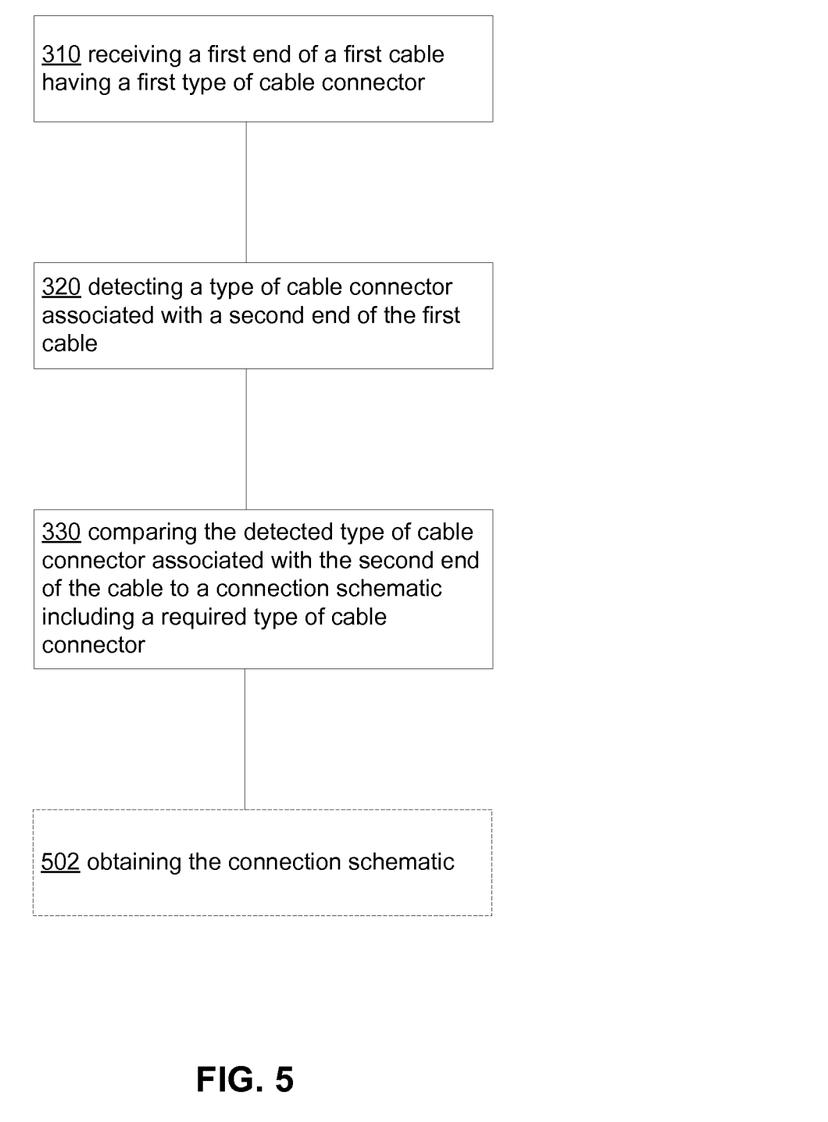
FIG. 5 is a high-level logic flowchart of a process.

FIG. 5 illustrates alternative embodiments of the example operational flow 400 of FIG. 4. FIG. 5 illustrates example embodiments where the operational flow 400 may include at least one additional operation. Additional operations may include an operation 502.

Operation 502 depicts obtaining the connection schematic. For example, as shown in FIGS. 1-3, the schematic data representing required cabling for a particular input source 107 and device under test 111 may be received by the processing unit 109 and stored in the memory element 110.

For example, schematic data representing required cabling for various known testing scenarios may be manually configured by a system designer and hard coded into the memory element 110.

In another example, the processing unit 109 may receive user inputs via the user input device 114 defining cabling connection requirements for a particular testing scenario involving particular input source 107 and device under test 111.

In still another example, the memory element 108 may contain information describing allowed or required cabling combinations either entirely within the memory element 108 or in combinations of hierarchical rules stored in several cable memory elements 108. Proper cabling may be established by comparison of specific cable identifications (e.g., a cable with a specific serial number), a cable type (e.g., a cable with a particular part number), or by signal type (e.g. an ARINC-429 cable).

Figure 6:
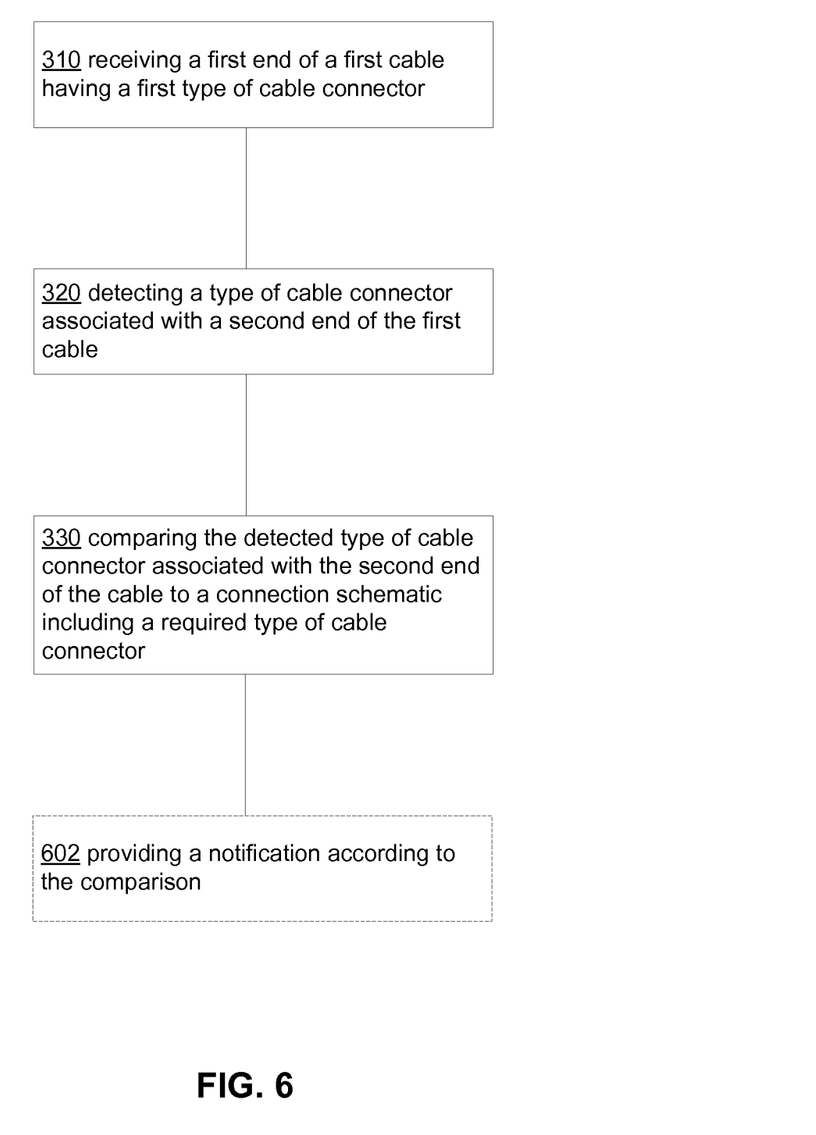
FIG. 6 is a high-level logic flowchart of a process.

FIG. 6 illustrates alternative embodiments of the example operational flow 400 of FIG. 4. FIG. 6 illustrates example embodiments where the operational flow 400 may include at least one additional operation. Additional operations may include an operation 602.

Operation 602 depicts providing a notification according to the comparison. For example, as shown in FIGS. 1-3, upon detection of the propriety of the usage of a cable 103 having a particular connector 105 in a particular testing scenario (e.g. as described above with respect to 430), the processing unit 109 may transmit data regarding the status of that detection to a display device 115 of the user interface 113 so as provide a notification to a user. The notification may include textual or graphical indication that the usage of the cable 103 having the connector 105 is proper or improper. The notification may further include instructions for correcting an improper installation (e.g. listing the proper cable connector type that should be used in a given testing scenario).

Figure 7:
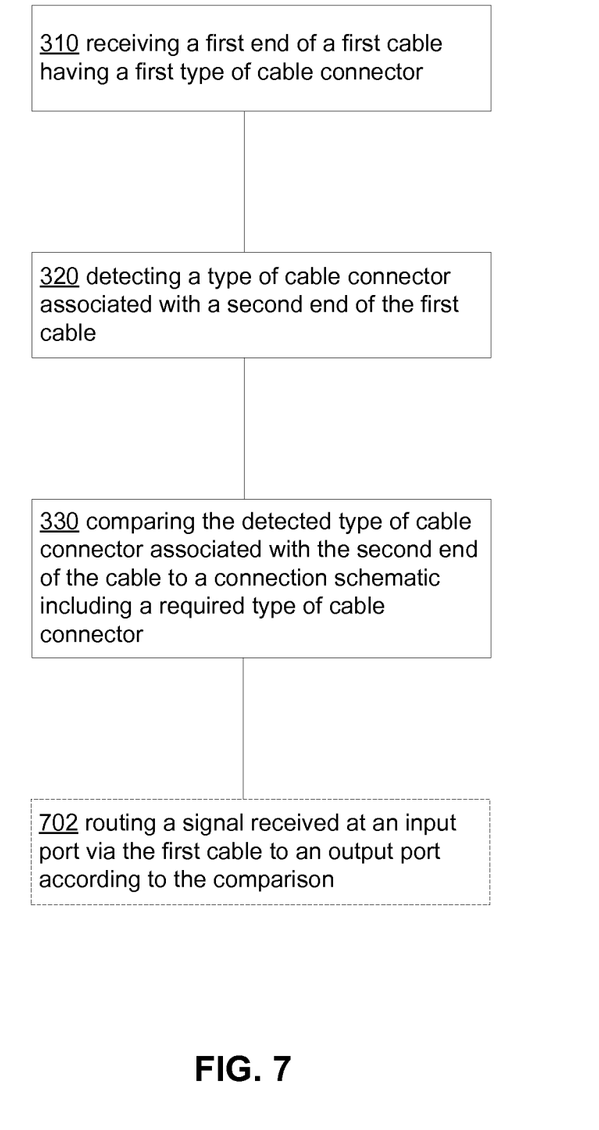
FIG. 7 is a high-level logic flowchart of a process.

FIG. 7 illustrates alternative embodiments of the example operational flow 400 of FIG. 4. FIG. 7 illustrates example embodiments where the operational flow 400 may include at least one additional operation. Additional operations may include an operation 702.

Operation 702 depicts routing a signal received at an input port via the first cable to an output port according to the comparison. For example, as shown in FIGS. 1-3, upon detection of the usage of a cable 103 having a proper connector 105 for a particular testing scenario (e.g. as described above with respect to 430), the processing unit 109 may route a signal received from the input source 107 via the link 116 to at least one output port 118 (e.g. to both output port 118 and output port 118') of the cabling interface 101 (e.g. enabling a switch connecting the input port 102 to the output port 118). Such routing may provide the signal (e.g. a test signal such as a test data or test power) to the device under test 111 via an output cable 119 so as to carry out testing of the device under test 111.

Figure 8:
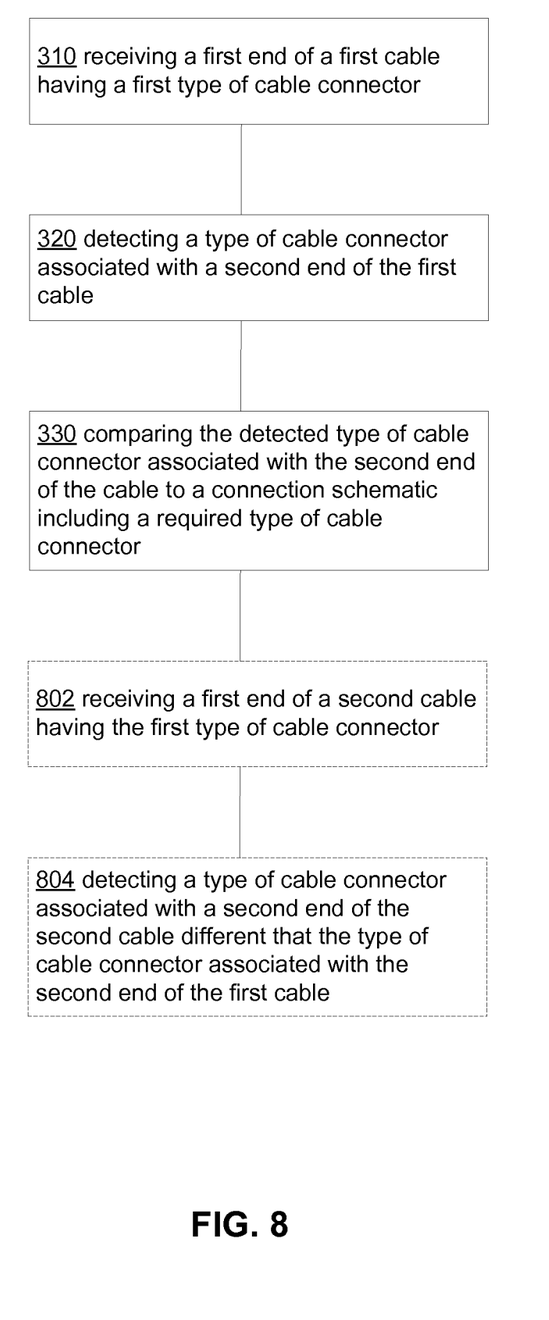
FIG. 8 is a high-level logic flowchart of a process.

FIG. 8 illustrates alternative embodiments of the example operational flow 400 of FIG. 4. FIG. 8 illustrates example embodiments where the operational flow 400 may include at least one additional operation. Additional operations may include an operation 802 and/or an operation 804.

Operation 802 depicts receiving a first end of a second cable having the first type of cable connector. For example, as shown in FIGS. 1-3, the connector 104 on the first end of the second cable 103' may be connected to the cabling interface 101 via input port 102. Connection of the connector 104 with the input port 102 may serve to establish the physical link 112 between the memory element 108 of the cable 103 and the processing unit 109. The connection of the connector 104 with the input port 102 may serve to establish the physical link 120 between the cabling interface 101 and the input source 107. The circuitry of the link 112 and the link 116 may be routed to the processing unit 109.

Operation 804 depicts detecting a type of cable connector associated with a second end of the second cable different that the type of cable connector associated with the second end of the first cable. For example, as shown in FIGS. 1-3, the processing unit 109 may query the memory element 108' of the cable 103' via the link 112' to obtain data regarding the identity of the second connector 105' on the second end of the second cable 103'. The data regarding the identity of the second connector 105' may be maintained in random access memory (RAM 121) associated with the processing unit 109.

It should be noted that those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into high-level descriptor languages (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure and optimize suitable transmission or computational elements, material supplies, actuators, or other structures in light of these teachings.

The foregoing detailed description has set forth various embodiments of the devices and/or processes via the use of block diagrams, flowcharts and/or examples. Insofar as such block diagrams, flowcharts and/or examples contain one or more functions and/or operations, it will be understood by those within the art that each function and/or operation within such block diagrams, flowcharts or examples can be implemented, individually and/or collectively, by a wide range of hardware, software, firmware or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, a solid state storage device (e.g. a USB drive), etc.; and a transmission type medium such as a digital and/or an analog communication medium (e.g., a fiber optic cable, a waveguide, a wired communications link, a wireless communication link (e.g., transmitter, transceiver, transmission logic, reception logic, etc.).

In a general sense, those skilled in the art will recognize that the various aspects described herein which could be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms. For example, the phrase "A or B" will be typically understood to include the possibilities of "A" or "B" or "A and B."

With respect to the appended claims, those skilled in the art will appreciate that recited operations therein may generally be performed in any order. In addition, although various operational flows are presented in a sequence(s), it should be understood that the various operations may be performed in other orders than those that are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to" or other past-tense adjectives are generally not intended to exclude such variants, unless context dictates otherwise.

Although specific dependencies have been identified in the claims, it is to be noted that all possible combinations of the features of the claims are envisaged in the present application, and therefore the claims are to be interpreted to include all possible multiple dependencies. It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

Further, all of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

What is claimed is:

1. A cabling verification system comprising:
   a first cable comprising:
      a first end terminating in a first type of connector,
      a second end terminating in a second type of connector, and
      a first memory element containing a connector type identifier of the first type of connector;
   a second cable comprising:

a first end terminating in a third type of connector different than the first type of connector,
a second end terminating in the second type of connector, and
a second memory element containing a connector type identifier of the third type of connector; and
a cabling interface comprising:
a processing device;
a first input port configured to receive the second end of the first cable and operably couple the first memory element to the processing device;
a second input port configured to receive the second end of the second cable and operably couple the second memory element to the processing device;
an output port configured to provide connection to a device under test; and
a database comprising one or more cable connection schemes required by the device under test;
wherein the processing device is configured to:
query the first memory element to determine the connector type of the first type of connector;
query the second memory element to determine the connector type of the third type of connector;
compare the connector type of the first type of connector and the connector type of the third type of connector to the one or more connection schemes required by the device under test;
select one of the first cable or the second cable to connect to the output port connected to the device under test, the selection being based on the comparison of the connector type of the first type of connector and the connector type of the third type of connector to the one or more connection schemes required by the device under test; and
establish communication between an input source and the device under test, wherein the input source is a device connected to the selected one of the first cable or the second cable.

2. The system of claim 1, further comprising:
at least one additional output port configured to provide connection to at least one additional device under test, wherein one or more cable connection schemes required by each of the at least one additional device under test is stored in the database.

3. The system of claim 1, wherein the input source comprises a connector configured to receive at least one of the first type of connector and the third type of connector.

4. The system of claim 1, wherein the first type of connector and the third type of connector are selected from:
at least one of an ARINC 429-type connector, an Ethernet cable connector, a coaxial cable connector, a fiber optic cable connector, a military circular connector, a CompactPCI connector and an ARINC 600 connector.

5. The system of claim 1, further comprising:
a cabling verification notification module.

6. A method for cabling verification comprising:
receiving a first end of a first cable having a first type of cable connector at a first input port;
receiving a first end of a second cable having the first type of cable connector at a second input port;
querying a memory element of the first cable to detect a connector type identifier of a cable connector associated with a second end of the first cable not received at the first input port via a connection through the first input port;
querying a memory element of the second cable to detect a connector type identifier of a cable connector associated with a second end of the second cable not received at the second input port via a connection through the second input port;
comparing the detected type of cable connector associated with the second end of the first cable and the detected type of cable connector associated with the second end of the second cable to a connection schematic including a required type of cable connector required by a device under test; and
selecting one of the first cable or the second cable to connect to an output port connected to the device under test, the selection being based on the comparison of the detected type of cable connector associated with the second end of the first cable and the detected type of cable connector associated with the second end of the second cable to the required type of cable connector.

7. The method of claim 6, further comprising:
providing a notification when at least one of the detected type of cable connector associated with the second end of the first cable and the detected type of cable connector associated with the second end of the second cable is deemed improper for the connection schematic.

8. The method of claim 6, further comprising:
establishing communication between an input source and the device under test, wherein the input source is a device connected to the selected one of the first cable or the second cable.

9. The method of claim 6, wherein the type of cable connector associated with a second end of the first cable comprises:
a cable connector selected from at least one of an ARINC 429-type connector, an Ethernet cable connector, a coaxial cable connector, a fiber optic cable connector, a military circular connector, a CompactPCI connector and an ARINC 600 connector.

10. The method of claim 6, wherein at least one of the detect a connector type identifier of a cable connector associated with a second end of the first cable not received at the first input port occurs in response to a request to transmit a signal from an input device via the first cable.

11. A system for cabling verification comprising:
means for receiving a first end of a first cable having a first type of cable connector at a first input port;
means for receiving a first end of a second cable having the first type of cable connector at a second input port;
means for querying a memory element of the first cable to detect a connector type identifier of a cable connector associated with a second end of the first cable not received at the first input port via a connection through the first input port;
means for querying a memory element of the second cable to detect a connector type identifier of a cable connector associated with a second end of the second cable not received at the second input port via a connection through the second input port;
means for comparing the detected type of cable connector associated with the second end of the first cable and the detected type of cable connector associated with the second end of the second cable to a connection schematic including a required type of cable connector required by a device under test; and
means for selecting one of the first cable or the second cable to connect to an output port connected to the device under test, the selection being based on the comparison of the detected type of cable connector associated with the second end of the first cable and the detected type of cable connector associated with the second end of the second cable to the required type of cable connector.

* * * * *